United States Patent
Tagg

(10) Patent No.: US 8,935,326 B2
(45) Date of Patent: Jan. 13, 2015

(54) COOPERATIVE NETWORK FOR MOBILE INTERNET ACCESS

(75) Inventor: James P. Tagg, Kent (GB)

(73) Assignee: Truphone Limited (GB)

( * ) Notice: Subject to any disclaimer, the term of this patent is extended or adjusted under 35 U.S.C. 154(b) by 291 days.

(21) Appl. No.: 12/684,348

(22) Filed: Jan. 8, 2010

(65) Prior Publication Data

US 2010/0115103 A1 May 6, 2010

Related U.S. Application Data

(62) Division of application No. 09/706,406, filed on Nov. 3, 2000.

(51) Int. Cl.
*G06F 15/16* (2006.01)
*H04L 12/28* (2006.01)
*H04L 12/46* (2006.01)
*H04L 29/06* (2006.01)

(52) U.S. Cl.
CPC ........ *H04L 12/2856* (2013.01); *H04L 12/4633* (2013.01); *H04L 63/029* (2013.01)
USPC .......................................... 709/204; 709/249

(58) Field of Classification Search
USPC .................. 709/227, 228, 229, 204, 249, 250
See application file for complete search history.

(56) References Cited

U.S. PATENT DOCUMENTS

| | | | |
|---|---|---|---|
| 6,005,575 A | 12/1999 | Colleran et al. | |
| H1837 H | 2/2000 | Fletcher et al. | |
| 6,044,259 A | 3/2000 | Hentila et al. | |
| 6,112,085 A | 8/2000 | Garner et al. | |
| 6,128,304 A | 10/2000 | Gardell et al. | |
| 6,144,667 A * | 11/2000 | Doshi et al. | 370/401 |
| 6,240,091 B1 | 5/2001 | Ginzboorg et al. | |
| 6,272,338 B1 | 8/2001 | Modzelesky et al. | |
| 6,289,462 B1 | 9/2001 | McNabb et al. | |
| 6,377,982 B1 * | 4/2002 | Rai et al. | 709/217 |
| 6,452,910 B1 * | 9/2002 | Vij et al. | 370/310 |
| 6,487,600 B1 | 11/2002 | Lynch | |
| 6,522,880 B1 | 2/2003 | Verma et al. | |
| 6,542,740 B1 | 4/2003 | Olgaard et al. | |
| 6,584,569 B2 | 6/2003 | Reshef et al. | |
| 6,587,557 B1 * | 7/2003 | Smith | 379/265.01 |
| 6,608,832 B2 | 8/2003 | Forslow | |
| 6,651,105 B1 | 11/2003 | Bhagwat et al. | |
| 6,680,923 B1 * | 1/2004 | Leon | 370/328 |
| 6,691,302 B1 | 2/2004 | Skrzynski et al. | |
| 6,693,878 B1 | 2/2004 | Daruwalla et al. | |
| 6,732,181 B2 | 5/2004 | Lim et al. | |
| 6,775,657 B1 | 8/2004 | Baker | |
| 6,904,466 B1 | 6/2005 | Ishiyama et al. | |
| 6,915,345 B1 | 7/2005 | Tummala et al. | |

(Continued)

OTHER PUBLICATIONS

IEEE Concurrency Apr.-Jun. 1998, pp. 30-39, Actors and Agents "Tunnel Agents for Enhanced Internet QoS" Hermann de Meer et al.

*Primary Examiner* — Douglas Blair

(57) ABSTRACT

A method and system for connecting mobile users to the Internet using cooperative interconnection. A node consists of a network element that has two connections methodologies—typically a node will have a radio link and a wired link to the Internet. To obtain a connection, a member of the service located themselves in proximity to a network node which is commonly provided by another member and the cooperative tunneling agent requests a secure link. All members of the service agree to give connection to the Internet upon request from another member.

3 Claims, 9 Drawing Sheets

(56) References Cited

U.S. PATENT DOCUMENTS

| | | |
|---|---|---|
| 6,938,087 B1 | 8/2005 | Abu-Samaha |
| 6,970,469 B1 | 11/2005 | Howarth et al. |
| 6,975,864 B2 | 12/2005 | Singhal et al. |
| 7,093,017 B1 | 8/2006 | Olgaard et al. |
| 7,114,010 B2 * | 9/2006 | Karaoguz et al. ............. 709/250 |
| 7,123,608 B1 * | 10/2006 | Scott et al. .................... 370/353 |
| 7,260,638 B2 | 8/2007 | Crosbie |
| 7,457,279 B1 * | 11/2008 | Scott et al. .................... 370/352 |
| 7,484,008 B1 * | 1/2009 | Gelvin et al. ................. 709/249 |
| 7,577,910 B1 * | 8/2009 | Husemann et al. ........... 715/744 |
| 7,813,822 B1 * | 10/2010 | Hoffberg ........................ 700/94 |
| 7,891,004 B1 * | 2/2011 | Gelvin et al. .................. 726/26 |
| 7,904,569 B1 * | 3/2011 | Gelvin et al. ................. 709/229 |
| 2001/0019604 A1 | 9/2001 | Joyce et al. |
| 2001/0033554 A1 * | 10/2001 | Ayyagari et al. .............. 370/328 |
| 2002/0007407 A1 | 1/2002 | Klein |
| 2002/0059434 A1 * | 5/2002 | Karaoguz et al. ............. 709/228 |
| 2002/0196771 A1 * | 12/2002 | Vij et al. ....................... 370/349 |
| 2003/0182431 A1 | 9/2003 | Sturniolo et al. |
| 2004/0132433 A1 | 7/2004 | Stern et al. |
| 2005/0138204 A1 | 6/2005 | Iyer et al. |
| 2006/0282518 A1 * | 12/2006 | Karaoguz et al. ............. 709/221 |
| 2007/0136480 A1 | 6/2007 | Stephenson et al. |
| 2009/0077207 A1 * | 3/2009 | Karaoguz et al. ............. 709/220 |
| 2011/0029644 A1 * | 2/2011 | Gelvin et al. ................. 709/220 |
| 2011/0078285 A1 * | 3/2011 | Hawkins et al. .............. 709/219 |

\* cited by examiner

| General Member Information | 301 |
|---|---|
| Member ID | # |
| Customer Record | Name, Address etc.. |

| Tunnel Provider | 302 |
|---|---|
| Allow data link | YES/NO |
| Allow voice link | YES/NO |
| Bandwidth share | 5%-ALL |
| Number of simultaneous users | 1-16 |
| Number of provided minutes | n |
| Number of discrete connection events | n |
| Total bits provided | n |
| Charge for uplink | $/hour |
| Cost to establish connection | $per connect |

| Tunnel user | 303 |
|---|---|
| Encryption level (data) | low-high |
| Encryption level (voice) | low-high |
| Pay for up-link | max $/hour |
| Number of used minutes (budget) | n |
| Link budget | max $/day |
| Polling Frequency | per hour |
| Cell phone record | Carrier, number etc... |
| Synchronize or buy | Table of desired content |

*Fig. 3*

| | Cable | Cell phone Slow Move | Cellphone Mobile pos | LAN (T1) | 802.11 | Bluetooth | LAN (T1) | Cell Phone Slow Move | Cell phone Fast Move | Bluetooth | ADSL + Their LAN | Cell Phone | Cable |
|---|---|---|---|---|---|---|---|---|---|---|---|---|---|
| Today | 500 | 9.6 | 9.6 | 10M | 11M | 1M | 10M | 9.6 | 9.6 | 1M | 256 | 9.6 | 500 |
| Min | 100 | 28 | 28 | 10M | 1M | 1M | 10M | 28 | 28 | 1M | 128 | 28 | 100 |
| Max | 2000 | 128 | 56 | 100M | 11M | 10M | 100M | 128 | 56 | 10M | 2000 | 128 | 2000 |
| | Home | Walking to train | In Train | In Office | In Meeting | Lunch Starbucks | Office Desk | Walk to Car | Car | Gas Station | Friend's Home | Taxi | Hotel |
| | 701 | 702 | 703 | 704 | 705 | 706 | 707 | 708 | 709 | 710 | 711 | 712 | 713 |

*Fig. 7*

COOPERATIVE NETWORK FOR MOBILE INTERNET ACCESS

The present application claims priority as a divisional application of U.S. patent application Ser. No. 09/706,406, filed on Nov. 3, 2000, the disclosure of which is incorporated herein by reference in its entirety.

BACKGROUND OF THE INVENTION

1. Field of the Invention

The present invention relates to a computer method and system for connecting to a fixed network and, more particularly, to a method for connecting mobile users to the Internet.

2. Description of Related Art

The Internet came into being in its current form in 1983 when all the computers connected to ARPANET—a military network—began using the same communication protocol. In 1986 ARPANET became NSFNET in a bid to link the USA's supercomputers. E-mail began to be commercially available in 1990 at much the same time that Mosaic—the first worldwide web browser—became a useful product. The Internet, comprising mainly the WWW (world wide web) and e-mail is now an extremely important business tool.

The world is now networked, much of this provided by TCP/IP (Transmission Control Protocol/Internet Protocol), but ATM (Asynchronous Transfer Mode) is still dominant in telecommunications. Most major companies have access to the Internet and the Internet backbone runs thru much of our environment. This infrastructure is made up from largely fixed, rigid connections: wires, routers, switches, and similar.

Human beings tend to move around when engaged in work and leisure. An easy way to connect to the fixed network is needed for these mobile users. Mobile users are commonly envisaged as people using a cell phone or other radio device, but for our purposes a "mobile user" is anyone away from their fixed home base.

It remains difficult for a mobile user to obtain a high bandwidth connection to the Internet for two reasons:
1. Wireless connections are inherently expensive as they use a rare resource—radio frequency spectrum—and require large infrastructure investments.
2. There are practical difficulties when away from home base, such as determining IP addresses, proxy server settings, negotiating billing and payment and security and privacy concerns.

Even the simple task of moving from one office to another within the same company can be fraught with complications and more often than not people fail to make connection when traveling away from home base. With so many companies relying on e-mail and the World Wide Web as a critical business tool, an inability to connect can prove costly to companies. In the last three years the ability to access the Internet has begun to migrate to mobile devices. Small mobile devices have tended to use a variety of specialist Internet access methodologies with varying degrees of commercial success. They all suffer from the limitation of low bandwidth and high cost.

There are a number of methods by which users can get access to data from mobile wireless devices: SMS, HDML, WAP, and I-Mode being the main standards. All of these standards suffer to some extent from problems such as limited bandwidth and complex authoring environments.

In SMS (short message service), users can send and receive simple, short text messages from their phone. A server at the mobile phone service either routes them to other mobile phone users or provides a gateway that translates the messages and sends them as e-mail to Internet e-mail services. The gateway will also translate incoming e-mail and send it to the user in SMS format. Although rudimentary, large successful businesses have been founded from sending these short messages demonstrating that people need data on the move and are prepared to pay for it.

In HDML (Handheld Device Markup Language), a web site is composed using specially modified tags. A wireless gateway translates these tags so that the mobile device may view them. A mobile device equipped with a micro browser capable of interpreting HDML can display this information on a small LCD.

In WAP (wireless application protocol), a web site is composed using WML (wireless markup language) and this information sent to a WAP gateway. The user gains access to this gateway either by dialing a RAS (remote access server) or by using a packet based system, commonly referred to as "always on".

In I-Mode, specialist tags are again used to create pages formatted in compact-HTML. These are served over a gateway to users on a packet-based system.

In the above systems a specialist gateway is used to provide output formatted for mobile devices. An alternative method of accessing the Internet from a mobile device is provided by fixed wireless systems such as Bluetooth and the IEEE 802.11 wireless LAN standard.

In the 802.11 and Bluetooth standard, two wireless devices establish a point to point or point to multi-point link using spread spectrum radio technology. The two wireless devices can be any type of electronic appliance (e.g., PC, PDA, Cell phone, microwave oven, home security system). This link replaces wires and does nothing to reformat the content of data.

Another wireless standard that has reached ubiquity in availability, but has very little usage, is IrDA (Infrared Data Association). In the IrDA standard two devices with IrDA capability positioned near one other can communicate using infra-red beams. The standard suffers from two problems. Firstly, the link is optical and therefore requires a clear line of sight. The devices must be positioned so that their ports are visible to each other or at least so that sufficient reflected light reaches the ports. Secondly, the two computers need to have their IrDA ports configured and switched on. This is a non-trivial task. The hardware must be enabled—commonly power saving and compatibility issues mean that computers are shipped with the port disabled. A device driver must be installed. Once the physical link is available a logical link is needed to allow file transfer or access to the hard disk of the companion computer. Security and privacy must be ensured.

Looking at problems of getting Internet access when mobile a number of steps are required:
1. Some form of driver software is needed to configure the user's hardware to allow a link to be made.
2. The physical link needs to be made. This may be by pointing the two computers at each other or connecting a back-to-back USB cable, which has been provided by, for example, the hotel at which the user is staying.
3. The host user needs to enable and share certain services, such as printers and hard disks and network connections.
4. The host user needs, itself, to log onto the Internet.
5. The host user needs to act as a gateway for the connecting user, translating and forwarding packets onto the Internet.
6. The IP address of the host's interface needs to be configured to a non-conflicting address with that of its Internet link.

7. The IP address of the connecting user needs to point to the host user.
8. The ports and proxy servers need to be set up. Even if no special set up is required, a user who normally works in a corporate network with special settings will need to write these down and then delete them from the system, remembering to type them back in when returning to the corporate environment.
9. If the link has a cost to it, a financial transaction needs to be entered into with metering and billing.
10. No simple solution is available to ensure a secure link.
11. E-mail may or may not require yet more steps to enable.

This multi-step process is fraught with difficulties and there are numerous potential points of failure. Most connections fail because either one of the steps cannot be completed, or each step is so time consuming that the user gives up before completing the task. Since mobile users are usually short of time, have limited resources (such as driver disks, spare cables) and have to configure multiple times as they travel thru different environments, the effort is very frustrating. Typically the above exercise is completed around 30% of the time with a mean time of effort of two and a half hours. Although many operating systems (such as Windows 2000™) allow connection sharing the implementation of these makes the task very complex.

An additional further complexity has been generated by the lack of interoperability between IEEE 802.11 and Bluetooth. Since both standards operate in the same frequency spectrum the two systems will tend to interference with each other.

Additional difficulties occur when a firewall is present. If a shared connection is obtained in the home or office, access to the Internet may be blocked or restricted by the activities of a firewall. The same technology that provides the firewall capability may also track usage and web sites visited providing a risk to privacy. Additionally, information that is sent or received may be logged causing considerable security risk.

Although the cellular system provides some degree of roaming, it provides no solution to inter-system roaming and uses expensive infrastructure, which results in high call cost. In addition, the process of connecting a PC or PDA to a cell phone is complex and requires considerable reconfiguration of the device.

The current mode of access to the Internet is predominantly through a one-to-one commercial negotiation. Each person has a connection to the Internet via their own ISP. When visiting someone else's home obtaining access to the Internet is difficult. Calling the ISP requires another phone line. In the case of ADSL or cable systems, the MAC address of the network adaptor is registered to the ISP so that a second user can't use the connection. You can install a network and enable connection sharing in your OS (for example Windows 2000™), but this involves a number of complex steps. In addition there are significant security implications to this. Generally home and commercial networks are not set up with the anticipation that roaming users will be physically connected to the network inside the Firewall. Thus many network services are not secured against internal access. (It is not uncommon for a corporate network running Windows™ 2000 to have numerous hard disks shared without passwords.) Although the firewall blocks this from external access, a local connection would be inside the firewall.

Although these problems have existed for some time, the emergence of Bluetooth and IEEE 802.11 are encouraging people to connect more often.

While the above discussion is centered on the difficulty of human beings obtaining connection to the Internet, it should be bourn in mind that autonomous machines have similar difficulties. Much talk is made of microwave ovens, video recorders, and refrigerators talking together using home networks. It is also envisaged that automobiles will be similarly equipped. These systems are likely to become ubiquitous over the next five years as networking capabilities are built into appliances. These devices need to obtain services from somewhere and need to obtain a connection to the Internet. It will be prohibitively expensive to give each device its own dedicated connection. The devices will also need services tailored to them. One can consider that an appliance once manufactured and shipped becomes a roaming device in need of connection to the Internet.

SUMMARY OF THE INVENTION

An embodiment of the present invention provides a method and system for connecting to a network—typically the Internet via a cooperative membership arrangement. Members of the cooperative networking service have an identifier that uniquely identifies them as a member of the service. A fixed member (host) enables its link capabilities for mobile users (clients) but directs those links to communicate with a secure piece of software—the Cooperative Tunneling Agent (CTA). Upon access by a mobile member, the CTA sends both identifiers and status information to a server. The server contains preference information on all members that can be referenced by their identifiers. The status information is compared to the preferences of the two members and, if the comparison is successful, a link to the Internet is provided to the mobile member. If the comparison fails, the members may be notified and allowed to modify the preferences, make a one-off exception, or reject the link. The CTA can work with or without reference to a server. When working independently of the server, the comparison is made using data from the host and the client and the server is only accessed if additional information or service is required.

The CTA ensures that the mobile user has no access to the fixed user's computer other than as a pipe thru to the Internet. To ensure that the mobile user's security and privacy are protected, the data packets may be encrypted and sent via the fixed host to the server. The server may decrypts the data and sends it to the Internet. Return data is similarly dealt with. By this method the fixed member cannot eavesdrop on the mobile member's data or voice traffic. Such encryption can be set at a variety of strengths according to user preference and applied selectively depending on the data type. Routing of the data may also be performed selectively according to data type.

An advantage of the system is that two members can quickly and simply set up secure link, so that one member can access the Internet thru the other members network connection without causing security risks to either member.

A further advantage of the system is that one member can use the low cost access method available to another user.

A further advantage is that voice calls can be sent to the host and routed over the IP network using VOIP technology, thus dramatically reducing costs.

A further advantage is that voice calls can be routed thru the cellular system to a local VOP server, thus saving long distance cellular charges.

A further advantage is that by simplifying the operation of logging onto the network thru fixed nodes, commercial node providers will find it easier to acquire customers and the service to those customers will be improved and simplified.

A further advantage is that by providing a universal logical standard for connection, incompatible transport protocols can be made compatible. In the example of Bluetooth and IEEE 802.11, the CTA can ensure that the protocols synchronize to divide their spectrum usage in either time domain or frequency domain for all members present.

A further advantage of the system is that, since access is automated according to preset preferences, the system can be used for the connection of autonomous appliances and machines which are not able to make complex decisions regarding optimal network access.

The link can transport either data or voice. In the case of voice, the CTA handles the VOIP (voice over IP) protocol. VOIP and Multimedia can be either sent via the complete path thru our secure server, or split apart to take a more optimum routing.

The software allows the user to access the Internet, send and receive e-mail, and obtain high bandwidth services such as MP3 files and movies. The network is cooperative, as each user agrees to both give and receive access depending on their status. Each user is a node. A cell phone located within 100 feet of a fixed host device can connect to the Internet through that device, obtaining phone calls at a fraction of the cost of a regular cellular connection. Similarly, a portable computer or PDA would be able to connect through a host node and obtain a high bandwidth link to the Internet for a modest sum of money. It is anticipated that there will be two main types of connection: cooperative connection and commercial connection. In a cooperative connection, a fixed user connected to the Internet provides a bridge so that other mobile users may access the Internet through their link. This link is provided free of charge in return for reciprocal roaming rights. In a commercial connection the user locates a commercial node, and the CTA negotiates connection and payment terms according to preset user preferences.

While this invention is primarily targeted at simplifying the task of connecting using fixed wireless devices such as Bluetooth or 802.11, it will apply to any connection methodology—IrDA port, network cable, serial cable, USB crossover connector, et al. Our invention is intended to facilitate connection to any rigid network infrastructure, but the Internet is the most important of these.

Means for cleanly handing off connection from one system to another are provided by the CTA. By storing both the customer's Cellular provider information and the Cooperative network ID, the call can be routed through either system. In addition, if a voice call is in progress and a Bluetooth cooperative connection becomes available, the call can be set up in the VOIP system and handed over and visa versa.

The technology provides the function of a bandwidth moderator. As a user moves about their daily life from home to office via different modes of transport, their requirements for Internet connection change in characteristic, and the mode of connection changes. Our technology sits between the user and the Internet constantly negotiating the most cost effective means by which they can gain access. While today the modes seem simple—it's a wired or a wireless link—this will not remain so in the future, and all software systems will require an agent to perform this task. It is an objective of the present invention to optimize the "last mile".

This system differs substantially from the cellular system in that a substantial amount of network hardware is provided by the members of the network and not by high capital, value dedicated infrastructure. It is generally a surprise to people when they realize how often they are within 100 feet of an Internet connection. Additionally, the cellular system provides no handoff methodology between differing classes of carrier.

BRIEF DESCRIPTION OF THE DRAWINGS

FIG. 3 is a table showing the data record structure for a customer.

FIG. 7 is a table describing a day in the life of a user.

DETAILED DESCRIPTION OF EMBODIMENTS

Figure 1:
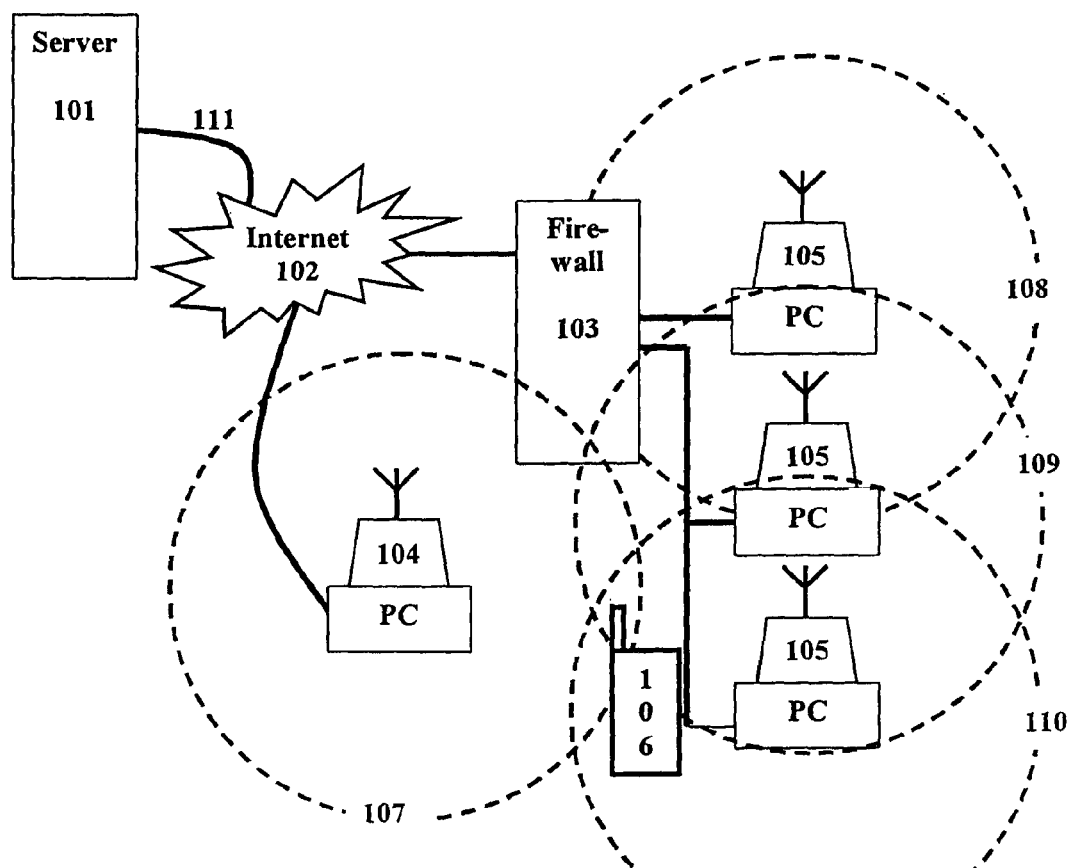
FIG. 1 illustrates tunneling Internet access in one embodiment of the present invention.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

The present invention provides a method and system for easy, secure, mobile Internet access thru fixed connections points. These fixed connection points being computers that are connected to the Internet, and have another port available for connection by one or more mobile users. A fixed connection point can itself be a portable device, such as a portable PC, and may be moved from time to time. The term is a relative one. To a mobile user, a PC with an Internet connection is a fixed device. For the purpose of discussions regarding the system operation, these fixed points will be described as hosts and a mobile user will be called a client. The host can be any form of general purpose PC or a custom built device, which has two connection methodologies and an ability to selectively connect those methodologies under program control.

The simplest system has a host and a client. The host will generally communicate with a server to transfer data and receive services, but a host can run in stand-alone mode if connection to a server is unavailable or if client security and privacy are not high concerns, such as when the host and client are used by the same person.

The system is composed of three main parts: The software application, the web server and associated web site, and specialist network services (e.g., streaming and VOIP which are provided by other parties).

The link functions include:
1. Download of software.
2. Installation of software.
3. Updating of software.
4. Registration of the user to the service.
5. Testing the system.
6. Location of another wireless node or enabled device.
7. Backup location of any Node (e.g., IrDA, wired, dialer, etc.).
8. Determination of payment conditions: cooperative free, cooperative with cost, commercial.
9. Determining whether the user permission matches the link available.
10. If it does, establishing the link.

11. If it does not, notifying the user of the availability, and giving them the option to accept or reject, plus update their user profile.
12. Provide voice over IP.
13. Call handover to cellular network.
14. Data handover to cellular network.
15. Encrypt/Encode data for safe sending to the remote web server.
16. Location of VOIP network nodes (Akamai™, Lipstream™, et al.) and direct communication with streaming servers.
17. Billing, most recent call information.
18. Fault logging and diagnostics.

The tunneling functions include:
1. Identify fixed line connection or another wireless node.
2. Connect to cooperative server and register.
3. Activate and monitor cooperative connection and enumerate service.
4. Negotiate link with request from cooperative member.
5. Provide secure link (tunnel) to Internet.
6. Handover to alternate link upon request or change in network status.

The server functions include:
1. Registration of users.
2. User preference setup.
3. Service list/Portal to customer services.
4. Decoding/De-encrypting transmission and forwarding to web.
5. Provide an Internet store and forward.
6. Negotiation of streaming links.
7. Negotiation of VOP link.
8. Allow registration to partner services.
9. Negotiate handover upon network status change.

Third party functions that may be linked to include:
1. Provide VOIP service (Lipstream™, Net2Phone™ Akamai™).
2. Provide Streaming service (RealNetworks™, Akamai™, Microsof™, QuickTime™).

The software application runs on both the client and the host, varying its mode of operation depending on its function in the network. (It is possible for the software to run within a browser thus giving a "software-less" mode of operation. It will be obvious, however, that software is indeed running in this instance.)

The web server provides the user interface to the service, allowing people to register, and also allowing the configuration software to correctly set up each machine and ensure that the software application which runs on the client's and host's is up-to-date and correctly configured.

In the case of multi-media and voice these, IP packets may not be routed to the server but may travel via a third party routing service for optimum performance.

The preferred embodiment of the Invention will now be descried with the aid of figures. The embodiment assumes that a short-range wireless link such as Bluetooth™ will be available, and the reader is directed to the Bluetooth specification for further implementation detail. In addition, a user skilled in the art should be able to translate the flowcharts into useable code by reference to examples provided in the literature, for example the Microsoft Developer Network™ for the Windows™ operating systems.

FIG. 1 illustrates the general layout of the network. A roaming device 106 (which might be a mobile computer, PDA, cellular telephone or home appliance) comes within range of the fixed wireless link of a member, circles 107-110. The mobile device determines the connection methodologies available to it and their relative merits, and then connects to the host using the best available standards.

Once the link has been established, the cooperative tunneling agent examines the preferences of the roaming member and the fixed member, and compares these with a database stored on the server. If the comparison generates a match, then standard IP packets are encrypted and sent from the roaming device 106 thru the fixed device 104 or 105, thru any present firewall 103, and thru the Internet 102 to our server via a link to the Internet 111. Our server 101 decrypts the packets and sends them onto the Internet via the link. Return packets from the Internet are passed back to the server and are similarly routed back to the member via the encrypted links.

There are two scenarios: corporate and home users. A home user, depicted as PC labeled 104, typically makes a direct connection to the Internet 102 without the benefit of a firewall 103. A corporate user connects to the Internet thru a proxy server and firewall 103. These two functions are shown as a single block, but may be comprised of several physical units (e.g., a router, a server, a proxy server, a firewall, and a security monitoring computer). For our purposes it is not important how many physical or logical blocks are involved, but rather merely that there is a Firewall function that we need to negotiate. Firewalls provide a range of services. Primarily they block all ports except the commonly used business ports such as http port 80. This stops hackers accessing systems using older methodologies that often grant considerable powers to a user. In addition, the firewall may block specific web sites thru the exclusion of certain IP address lists—"black list".

These preferences may be appropriate for the corporation, but wholly inappropriate for the member requesting the tunnel. Therefore the tunneling agent can encode all packets and send them thru port 80, bypassing any corporate specific snooping of the data. If the UDP ("user datagram protocol") port is available, this may be preferentially used for sending VOIP and other real time packets.

References to the server in this description may apply to any server providing our service. There may be more than one server on the network. Accesses may be cached at any point in the network. There may be several synchronized servers located geographically to improve throughput and efficiency of the system. The actions of the server may be split across several logical or physical devices so as to optimize performance. In addition some specialized tasks may be offloaded to third party servers. The server may be the computer of another member such that there are no specialist servers in the system and all tasks are distributed. In such a case the members database might be duplicated and distributed thru the network to provide security and redundancy and avoid a single point of failure.

Figure 2:
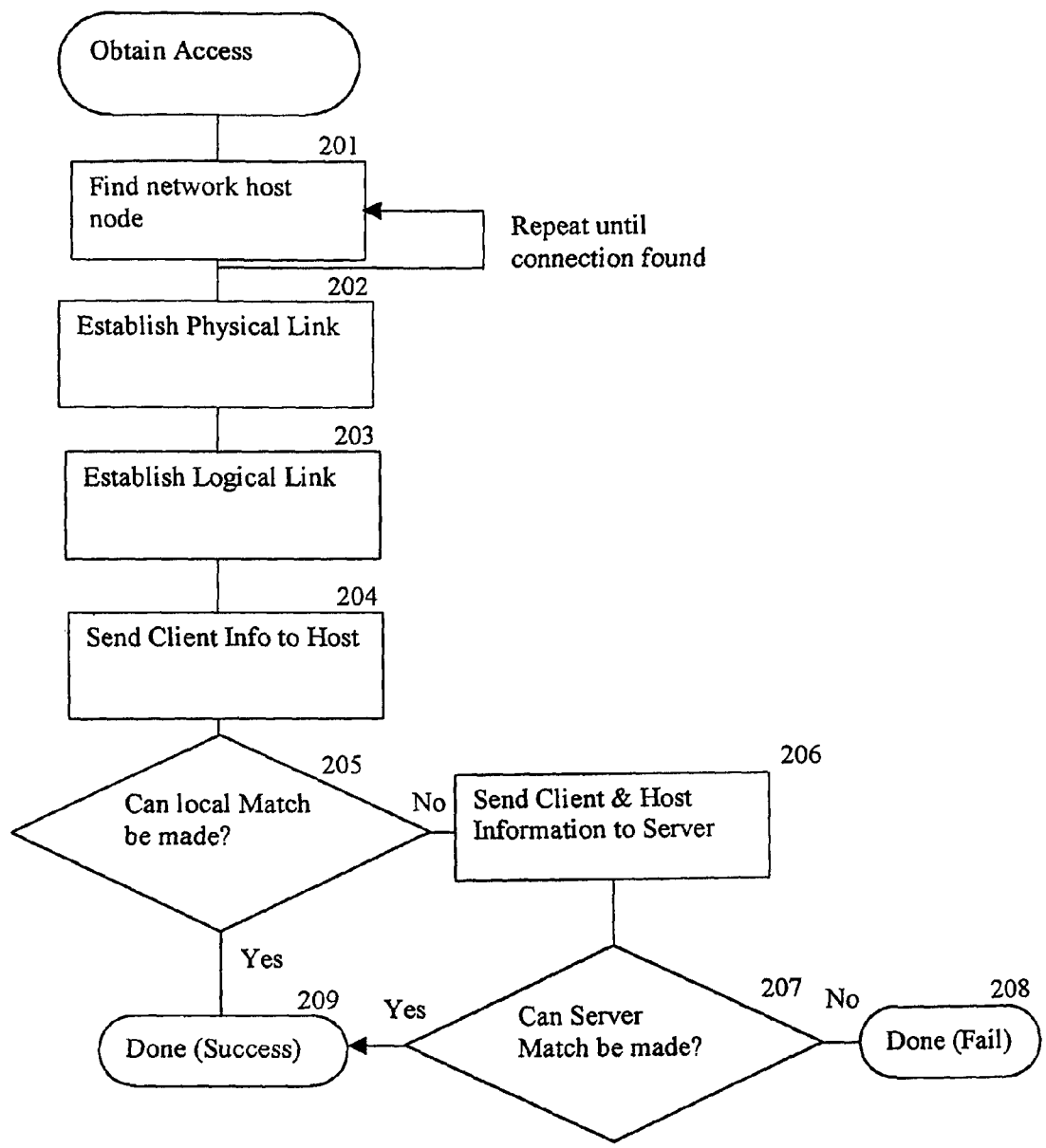
FIG. 2 is a flowchart of the process by which a link is established.

FIG. 2 is a flowchart giving the steps required to establish a link and obtain access to the Internet. The tunneling agent running on the client computer sits in a loop attempting to find a network node 201. The polling rate can be set by user preference, or turned off and restarted by user command at a later stage. In the case of a Bluetooth™ radio link the link protocol will find a network node and establish the physical link in step 202. At this point a physical link exists between the two devices, but no services are yet available. The host computer has been pre-configured to direct all physical links to the CTA (cooperative tunneling agent), which acts as a gate keeper for all network access. Thus the logical link 203 is set up to point only to the CTA. The client then sends the client ID and associated information to the CTA. If this is the first access by a user to the host system, the local match step 205 will always fail. However, the match can fail for two reasons.

Firstly, that the preferences don't match immediate failure can be notified to the client without reference to the server. If the preferences match but insufficient information is held to determine whether a complete link can be made, the host will contact the server. (In certain circumstances, such as the request for a non-client-secure link, the client and host can operated independently of a server.) The client and host information is sent to the server in step 206, and the server attempts to make a match in 207. If the match fails, a link is not made and the user is notified and given options to modify their preferences and start again. If the match is successful the link is made and link information is cached on the host machine. This information can be used to reestablish the link without reference to the server if the link is broken. A mobile user who is on the edge of range may be constantly moving in and out of range, so caching the link information allows the link to be made and broken quickly without a server request being required every time.

FIG. 3 is an excerpt of a member record showing the important elements in creating a match between cooperative members. A person skilled in the art will appreciate that there will be other fields required to fully describe the customer and log historical information but, these are generic to all ISP (Internet Service Provider) customer records. Remembering that every user can be a host or client, the record is appropriate for all members. The record is divided into three main sections: general data 301, tunnel provision 302, and tunnel request 303. In simple terms the member agrees to grant access to the Internet on certain terms to other members. Members define the parameters on which they will accept access. If two parties come into range and the granting and accepting criterion match, a link is enabled. The most common link is a fixed member (host) connected to the Internet by an always-on connection, such as an ADSL modem, granting free access to a mobile member. Another common connection occurs where the host is connected by metered access. The host can inform the client of the cost prior to making a connection to the network. The process by which this information is used to establish a link is detailed in FIG. 8.

Figure 4:
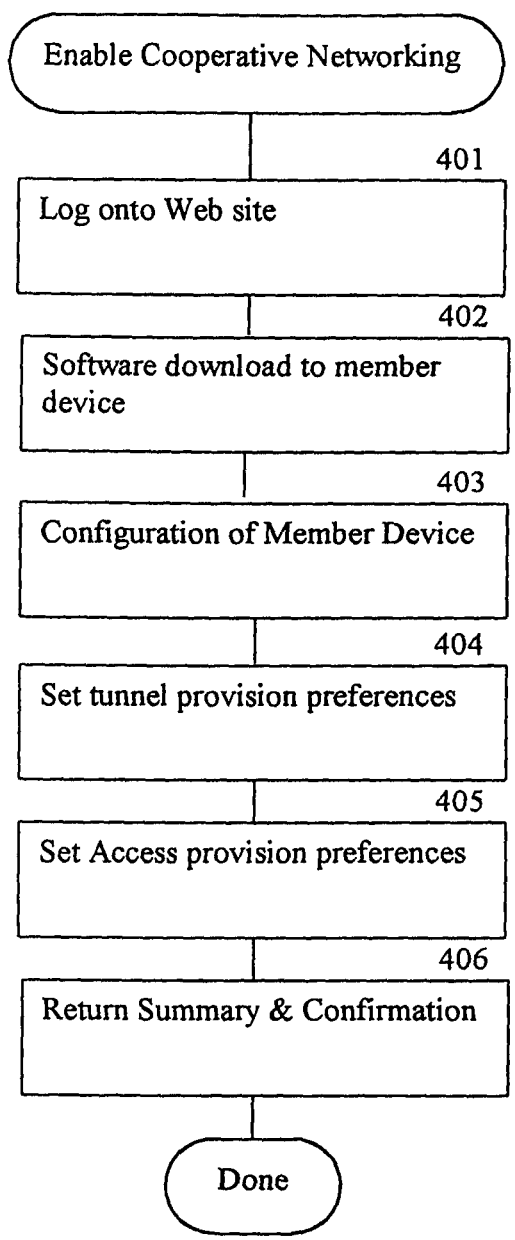
FIG. 4 is a flowchart of the process by which cooperative networking is enabled.

FIG. 4 is the flow diagram by which cooperative networking capability is enabled. In step 401, the user logs onto the website to requests the service. In step 402, software is downloaded to the member device. In step 403, the software scans the members system and determines the connection methodologies available, sets parameters, and directs the flow of data from those methods to a secure piece of software. In step 404, the user sets the tunneling preferences that they wish to grant to other members along with their personal details. In step 405, the user sets the access provision preferences they would like when they use the network. In step 406, the system summarizes the preferences and confirms they meet the customer policies pertaining at the time. These preferences are stored on the host/client with the associated user ID. Confirmation of credit approval can be given at this point.

One skilled in the art would appreciate that the software could be provided by other means, such as a floppy disk or CD-ROM.

Rather than downloading and running the software on the client system, the software could run on the server and client system using a method such as Active Java™ Pages. However in order to configure the client system the software will need to undertake a number of low level tasks which might be protected from modification by a Java program, and downloadable program elements are generally required.

Some operating systems, when connected to a new network, automatically log onto a default network specific web page upon boot-up. This feature can be readily provided so that a client system has only to connect their computer and turn it on, and the host node will automate steps 401 and 402.

In the absence of a network connection, the host computer may store a copy of the installation and registration software, so that the registration and setting of preferences can be performed off-line and then uploaded to the server upon next connection.

The configuration software may be "beamed" from one user to another, or transferred over the link to user who does not yet have the service by a push or pull methodology.

Figure 5:
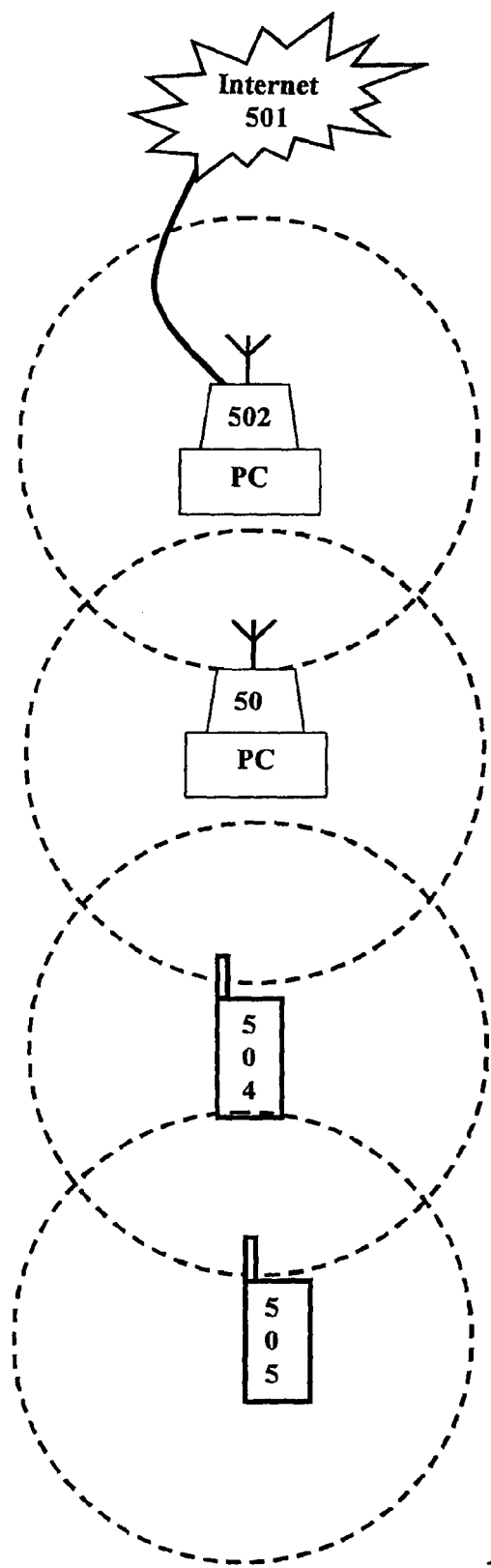
FIG. 5 is a diagram illustrating recursive service discovery.

FIG. 5 illustrates recursive service discovery. In this specification we have generally discussed systems where there is one fixed node connected to the Internet providing one or more Internet connections to mobile nodes. However, it may often happen that a mobile node is not within range of a fixed node, but is within range of another mobile node that is itself within range of a fixed node: a two hop connection. In this figure we show a three-hop connection. A mobile user 505 wants to gain access to the Internet. Thru the wireless network it connects to another mobile user 504, and requests a tunnel to the Internet. This unit is not connected to the Internet thru a wired connection, and so itself makes a request to another unit 503. This unit, although fixed, has no hardwired Internet connection and so connects another Computer 502, which does have a connection to the Internet 501, and a link is made. In this example, the link is established on a request basis, as it is undesirable to establish a permanent link for power conservation: a pull system. However the link between 502 and 503 can be established once and be substantially permanent, as both units have mains power supplies: a push system. Thus the network can spread out to all permanently powered computers that are within range of each other, and can be further increased in size on an ad hoc basis by requests from mobile units. The scope of the network may be pushed outwards to encompass all available nodes, or pulled outward by devices wanting connection to the fixed network.

In order to save power, it may be necessary for systems to synchronize their waking by registering a time pulse from the server and waking at predetermined times. (Packet delay time must be measured and added to the time synchronization pulse to ensure accurate synchronization of the servers.) Thus all the components in a system may wake at a predetermined time to attempt to push the network outwards.

Figure 6:
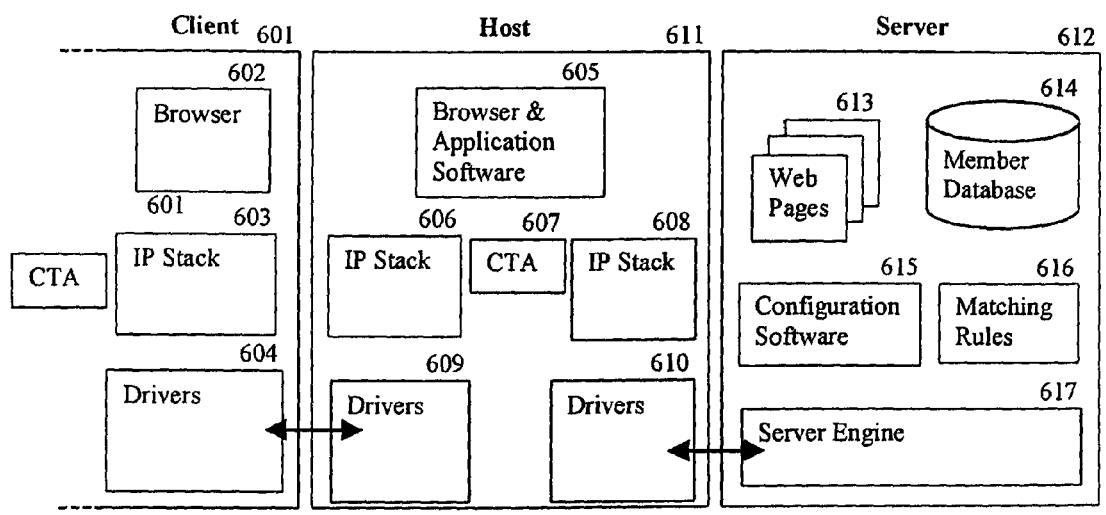
FIG. 6 is a block diagram of the elements of the system.

FIG. 6 illustrates, in block diagram form, the elements of a system. The client Browser 602 is pointed at the cooperative network website. It downloads and runs a program that sets up the computer. (This set-up was described in detail in association with FIG. 4.) The set-up means ensures that the correct drivers are installed on the computer to physically utilize the ports of the computer, and ensures that the IP stack and network resources are available and can be intercepted. Depending on the exact O/S, the CTA cooperative tunneling agent will either redirect all network calls thru its routines or provide a simple means for switching itself in when needed. The best method is usually described with examples in the documentation of the operating system. The software for the client is the same as that of a host system, but the CTA on a host system only needs to talk to the uplink as there is no further downlink to manage. That said, the downlink must be left in a state awaiting connection so that a multi-hop request can be made.

The host computer runs two IP stacks and two sets of network drivers. The first set, 606 and 609, are used to communicate with the client. The second set, 608 and 610, are used to talk to the Internet. The CTA 607 provides a low level link between the two. The host browser and applications are generally unaware of the presence of the link unless the host desires to know, in which case it can either run a utility, point to a predefined web page, or enable a status notification. The host applications utilize the IP stack and drivers 608 and 610 in the normal way. The server comprises: a server engine 617 that performs all the tasks of linking with the Internet, and decrypting and re-routing packets; a store containing the latest configuration software 615; the matching rule file 616; and the member database 614 and the web pages which together form the web site 613. A packet from the client takes the following path. In the case where the client makes a web page request the browser routes the call to the IP stack in the client computer. The CTA intercepts the request, encrypts it, and encapsulates the packet in a new packet, which is routed to the host. The host picks up the packet and routes it thru the CTA to the outgoing stack, adjusting the IP address appropriately. The server receives the packet, de-encapsulates it, decrypts it, and sends it onto the web. When a reply packet arrives, it is encrypted, encapsulated, and sent to the client. Further details on implementation of tunneling protocols can be found in the literature.

FIG. 7 is a table describing one potential typical day for a mobile Internet user, and illustrates the complex options available for connection and the many hand offs between systems. Starting in the home 701, the user has a cable modem giving access to the Internet at 500K bytes per second. Walking to the train 702, potential access speed drops to 9.6 Kbps using their mobile phone. On the fast moving transport mode of a train 703, the potential connection speed is limited, even in the new 3G networks that are being proposed. Once at work a free connection is available to the Internet using the office LAN 704. When the user goes to a meeting, they disconnect from their LAN and move either to a different LAN node or a mobile network provided by the IEEE 802.11 standard 705. As they go out to lunch in a local coffee bar Starbucks™, they have access to a public Bluetooth node 706. Back in the office 707, LAN access is again available. Cell phone is available as they walk to their car 708 and drive in their car 709. At a gas station where they stop, a Bluetooth link is again available for high speed access 710. At a friend's house an ADSL link 711 is available, but connecting to that LAN could be by a variety of means, including Bluetooth link or network cable. After leaving their friends house, our user goes via Taxi 712 to a Hotel where a high speed Internet link kit is available in the closet of their room 713. It is an object of our Invention to make such mobile use simpler by provision of means to mediate the handoffs between these systems, store user and network data centrally, and to provide common access links to all these different networks.

Figure 8:
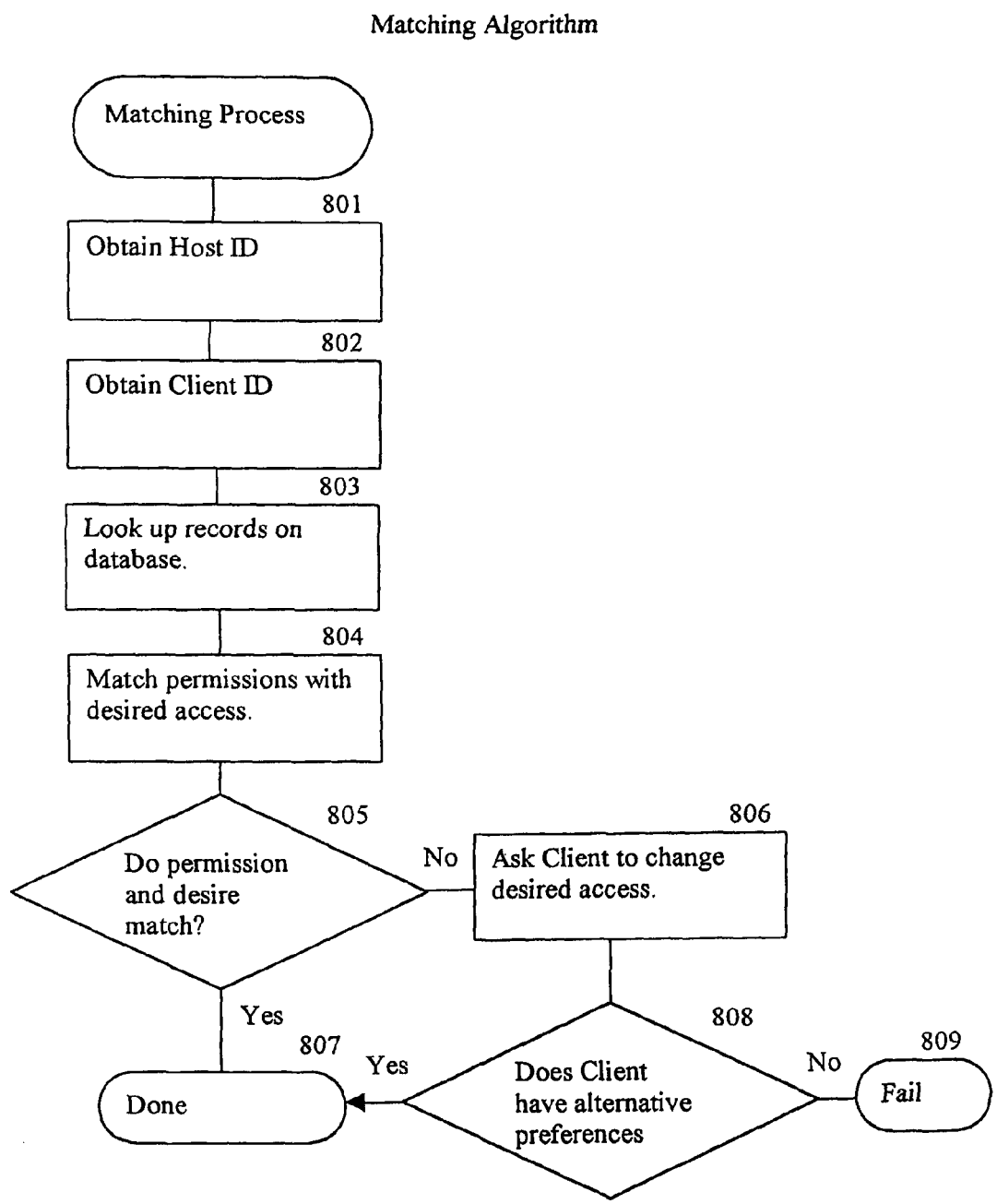
FIG. 8 is a flowchart of the matching algorithm.

FIG. 8 is a flowchart illustrating the matching process. The matching process obtains the host 801 and client ID 802, and looks up the record on the database 803. It then attempts to match the access permission with the desired access 804/805. If this fails, the client is asked whether it wants to change preferences 806. (Typically the failure will occur because the client has no settings for obtaining a paid link to the Internet if the host is a commercial link or a cooperative link with non-zero incremental cost for access. The host will want to pass this cost onto the client.) This will require the client to amend their record 807 to provide billing info, and to set the maximum connection charge and per minute charge that they are prepared to pay for an Internet connection. In the case of a paid link, they can further set a budget for link costs.

Figure 9:
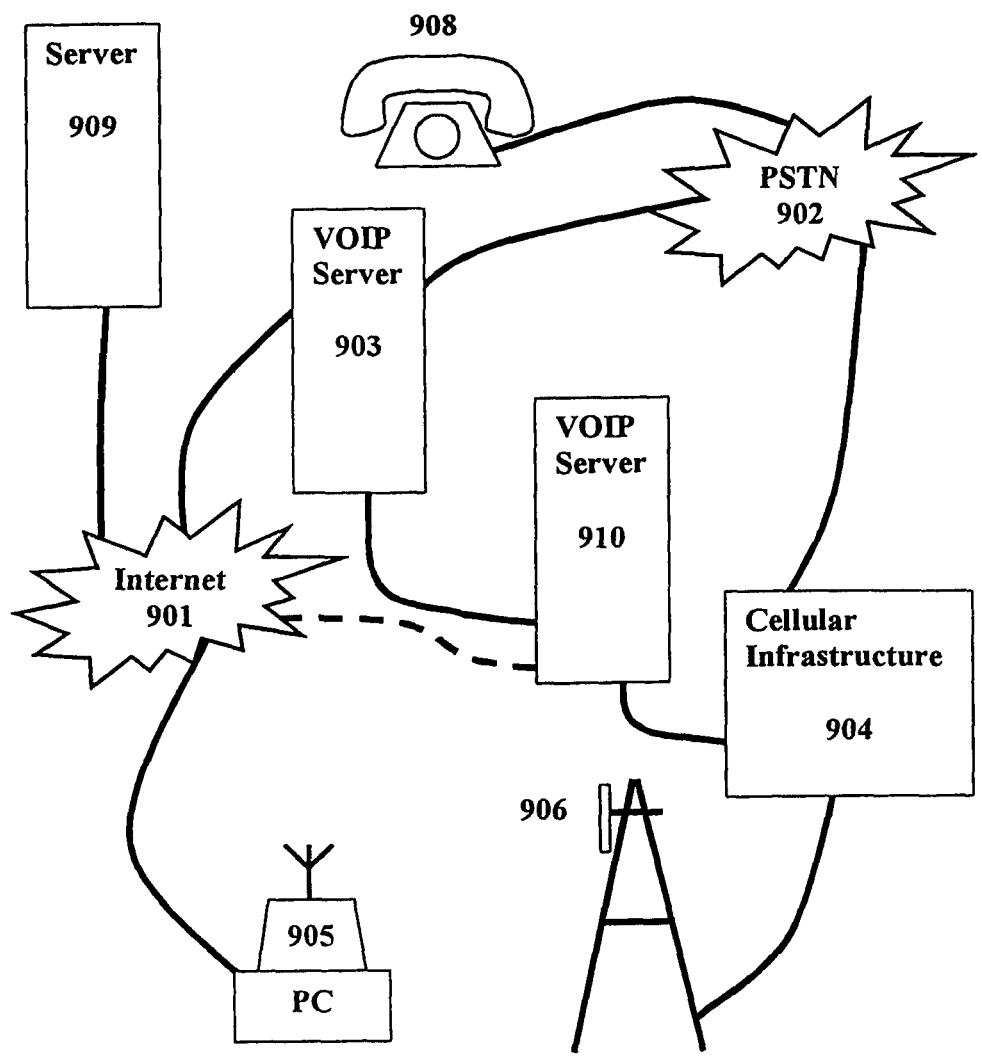
FIG. 9 is a diagram illustrating voice over IP and service handoff.

FIG. 9 illustrates handoff between a fixed wireless, Internet based, VOIP system and the cellular system. A mobile user 907 is within range of two methods for placing a call: a PC running our cooperative networking service and a cellular tower. The call might be preferentially placed to either unit based on the users pre-set preferences or based on the current situation. Both links could be made or broken independently, and exist simultaneously. In the case of connection made over the Internet, voice packets are sent over the air using a wireless link, such as Bluetooth or IEEE 802.11, to the host 905. These packets are routed thru the Internet 901 to a VOP server 903. The VOP server converts IP packets to a form suitable for use over the PSTN, and handles making and breaking the connection to users. There are many VOIP servers, two are shown here, located in each region such that the call is placed at a local rate. If the user moves away from the fixed wireless link 905 or the Internet becomes congested such that call is no longer of sufficient quality, a factor that can be determined either automatically or by the user, the call can be dialed on the cellular link. There are a number of methods that handoff could take. Firstly, the call could be dropped by the VOIP server and a new call initiated end-to-end thru the cellular network to the destination 908. This would result in a break in the call. More suitably, the mobile device would call a VOP, either the existing server 903 or a server located near to the caller 910. The VOIP server would take information from the cooperative network server and route the call to the already established PSTN link and then to the destination 908, thus maintaining the call. A benefit of this is that the call is not dropped, interrupted, or reinitialized. A further benefit is that mobile device can place a call to a local VOIP server 910, which forwards the information to a VOIP server local to the receiving party, thus saving cost. The call routing between the two VOIP servers can be via the public Internet (dashed line) or thru a proprietary network.

The host node may send data using IP over the air, or it can emulated the Bluetooth™ air interface and appear as a cordless telephone base station for the client device. By this method, no specialist software needs to run on the client device if that device is a handheld phone or similar. Security can be preserved by not decrypting the air interface on the host system and passing the un-decrypted information onto the server.

The use of this technology will enable a number of commercial services that have hitherto been prohibitively expensive or complex.

Roaming users will be able to get automatic high bandwidth connections to the Internet wherever there is another member present. Since members can be commercial or cooperative in their action, this will allow ubiquity of service.

One can envisage a member parking their car outside their home. The CTA connecting automatically to their home computer and synchronizing their MP3 music collection with their on board hard drive.

One can envisage a member driving into a gas station, purchasing a movie for their children using the onboard computer and, while gas is being pumped and paid for, the movie is downloaded to the on-board entertainment system.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

What is claimed is:

1. A method of creating a cooperative network comprising:
   providing software to a first system and a second system;
   the first and second systems each being capable of being configured by the software to identify the system as a member of a cooperative network and to act either as a host system or a client system; the host system being capable of connecting with a server on a target network; the server having associated software that would allow members of the cooperative network to obtain access to services; the host system and client system also being capable of communicating with each other using the provided software;

identifying the client system as a member of the cooperative network to the host system;

linking the client system to the host system when the client system has been identified as a member; and connecting the client system to the server via a tunnel through the host system; the server allowing the identified and linked client system access to the services via the tunnel through the host system.

2. The method as recited in claim 1 wherein the services is access to the Internet.

3. The method as recited in claim 1 wherein the services is VoIP.

\* \* \* \* \*